(12) United States Patent
Hudis et al.

(10) Patent No.: US 7,568,204 B1
(45) Date of Patent: Jul. 28, 2009

(54) UNIFORM TRANSFER OF DATA INDEPENDENT OF THE TRANSFER MECHANISM

(75) Inventors: Irena Hudis, Bellevue, WA (US); Alan Geoffrey Boshier, Redmond, WA (US); Lev Novik, Bellevue, WA (US); Yunxin Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 934 days.

(21) Appl. No.: 10/175,935

(22) Filed: Jun. 20, 2002

(51) Int. Cl.
*G06F 9/46* (2006.01)

(52) U.S. Cl. .................. 719/330; 719/328; 715/234; 707/1; 707/100

(58) Field of Classification Search .......... 719/330, 719/328; 707/100–104.1, 1, 2, 10; 715/513, 715/503, 769, 770, 904, 907, 234; 709/232
See application file for complete search history.

(56) References Cited

U.S. PATENT DOCUMENTS

| | | | | |
|---|---|---|---|---|
| 5,206,951 A | * | 4/1993 | Khoyi et al. ............... | 719/315 |
| 5,422,999 A | * | 6/1995 | Travis et al. ............... | 709/217 |
| 5,754,849 A | * | 5/1998 | Dyer et al. ................ | 707/101 |
| 6,671,853 B1 | * | 12/2003 | Burkett et al. ............ | 715/235 |
| 6,732,109 B2 | * | 5/2004 | Lindberg et al. .......... | 707/101 |
| 6,848,108 B1 | * | 1/2005 | Caron ....................... | 719/315 |
| 7,028,312 B1 | * | 4/2006 | Merrick et al. ............ | 719/330 |
| 2003/0004993 A1 | * | 1/2003 | Templeton et al. ........ | 707/513 |
| 2003/0023628 A1 | * | 1/2003 | Girardot et al. ........... | 707/513 |

* cited by examiner

*Primary Examiner*—Li B Zhen
*Assistant Examiner*—Phuong N Hoang
(74) *Attorney, Agent, or Firm*—Workman Nydegger

(57) ABSTRACT

A uniform data structure contains a number of data fields. Some of the data fields are dedicated to contain information concerning the transfer of a data segment of a particular type (such as an XML segment) using one particular transfer mechanism (such as transferring as a string or DOM object, or transfer using an interface such as ISAXContentHandler, ITextSource, ITextSink, or IDOMSink interfaces). Other data fields are dedicated to contain information concerning the transfer of data segments of the same particular type using another transfer mechanism. When a module is to transfer a data segment, the module will cause the unified data structure to be altered as appropriate for the desired transfer mechanism.

19 Claims, 4 Drawing Sheets

UNIFORM TRANSFER OF DATA INDEPENDENT OF THE TRANSFER MECHANISM

BACKGROUND OF THE INVENTION

1. The Field of the Invention

The present invention is directed to transferring electronic data in a uniform manner. More particularly, the present invention relates to transferring data using a common data structure regardless of the format used to represent the data, and regardless of the transfer mechanism to be used to transfer the data.

2. Related Technology

Computing technology has transformed the way we work and play. Computers consist of hardware components such as for, example, processors and memory capability. Some of the memory capability is typically non-volatile in the sense that it retains its content when the computer loses power. For example, hard disks and CD-ROMs are each forms of non-volatile memory. Some of the memory capability is typically volatile in the sense that it loses its content when the computer loses power. For example, system memory (also commonly referred to simply as "memory") is often volatile.

Although volatile, system memory is useful in forming runtime modules. Such runtime modules may include, for example, data structures and objects. These modules are often formed in system memory in response to software such as an operating system, an application program, or portions thereof, being executed by one or more processors. Such modules are often capable of communicating with each other to cooperatively perform tasks.

One common way of doing this is for one module (called herein a "called module") to "expose" an interface to other modules (called herein "calling modules"). In other words, the called module publishes methods that may be called by calling modules. A calling module makes the called module perform a particular method by placing a function call to the called module. The function call follows a predetermined standard called an Application Program Interface (API). The called module may also communicate with yet other modules to form a network of modules that cooperatively perform complex actions. Such complex actions may include running a graphics-intensive computer game, performing complex engineering simulations, or managing information such as calendars, e-mails, tasks, or the like. Since computers are often general purpose, the variety and scope of complex actions that may be performed by the computer seem to be limited only by the apparent limitless imagination and skill of the software programmer.

In order to perform complex actions, modules will almost inevitably need to communicate data one with another. Often, the data is represented by a data structure that follows a predetermined pattern or "schema". This allows the module that receives the module to not just read the data, but also determine the meaning of the data so long as the module recognizes the predetermined pattern.

One way of patterning data is to form a hierarchically-structured tree of name-value pairs. One convenient way of doing this is to represent the data as an eXtensible Markup Language (XML) document. There are various ways to transfer an XML segment from one module to another. Currently known transfer mechanisms include transferring the XML segment as a UTF-8 string, Unicode string, or DOM object. Also, the XML segment may be transferred using interfaces such as an, ISaxContentHandler interface.

Each of these transfer mechanisms is well-known to one of ordinary skill in the art and has relative advantages and disadvantages. For example, let us compare transferring strings versus transferring DOM objects. DOM objects take processing resources to create. However, once created, they are useful as they contain embedded parsing information. On the other hand, strings take very little processing resources to create. However, strings contain no embedded parsing information. Accordingly, the selection of a transfer mechanism is important when transferring an XML segment as the selection may have a real impact upon the efficiency of the computer system.

When a software programmer designs a software module to transfer an XML segment, the source code that the software programmer writes typically depends on the transfer mechanism that is to be used to transfer the XML segment. For example, there may be APIs focused on transferring strings between modules, and other different APIs focused on transferring XML through an ISAXContentHandler Interface. Such non-uniformity adds complexity to the source code and thus increases the cost and potential for error associated with authoring source code.

BRIEF SUMMARY OF THE INVENTION

The present invention is directed to methods, systems, computer program products and data structures that allow for a more uniform transfer of a data segment having a particular format such as XML regardless of the underlying transfer mechanism that is used. Accordingly, the API for transferring data segments having that format may be more straightforward thereby reducing the complexity required to draft computer-executable code representing the transfer. This reduces the cost of drafting the code, and reducing the risk of human programming error.

The unified transfer is accomplished via a unified data structure that is used regardless of the transfer mechanism used to transfer the data segment. The data structure has a number of fields that each may be dedicated to containing information for transferring the data segment using a particular transfer mechanism. For example, when transferring an XML segment, various transfer mechanisms may be used such as, for example, transferring the data segment as a UTF-8 string, a Unicode string, a DOM object or an ISAXContentHandler interface. Each of these various transfer mechanisms may have a dedicated field into which information is inserted should that transfer mechanism be selected for use. The calling module inserts the information relevant for the transfer into the appropriate field depending on the selected transfer mechanism, and optionally also indicates the desired transfer mechanism.

There are cases where cooperative interaction is needed between the calling module and the called module in order to complete the transfer. For example, when transferring an XML segment using a particular interface that uses a sink to accomplish the transfer, the calling module needs the called module to establish the sink before the calling module can begin providing the data segment through the interface. In such cases, the calling module may identify the transfer mechanism in the unified data structure, then pass control of the unified data structure to the called module. The called module then performs any facilitating actions such as establishing a sink, then modifies the data structure to contain an identification of the sink or other information that allows the calling module to insert the data segment through the interface. The calling module then reads the information and performs the transfer through the interface. Accordingly, the unified data structure may be used regardless of the underlying transfer mechanism.

When the data segment represents a request, the response may also be transferred in a similar manner, except with potentially its own unified data structure for the response. The calling module may specify in the request the transfer mechanism to be used when responding as well. The data segment may also be a portion of a larger data entity. For example, if the data to be transferred is an XML document, the data segment may be a portion of the XML document. Accordingly, different transfer mechanisms may be used to transfer various segments of the XML document.

By providing for a unified way of transferring a data segment of a particular type regardless of the transfer mechanism, the programmer need not be concerned about the particular underlying transfer mechanism. Also, since a unified data structure is used, a unified Application Program Interface (API) for communicating such data segments may be designed that is centered around the unified data structure. This use of a unified API regardless of the transfer mechanism reduces the complexity associated with programming code that ultimately performs the transfer.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention cam be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for transferring a data segment of a particular type from one module to another using a uniform data structure. The uniform data structure contains a number of data fields. Some of the data fields are dedicated to contain information concerning the transfer of a data segment of a particular type (such as an XML segment) using one particular transfer mechanism (such as transferring as a string or DOM object, or using a particular interface). Other data fields are dedicated to contain information concerning the transfer of data segments of the same particular type using another transfer mechanism. When a module is to transfer a data segment, the module will cause the unified data structure to be altered as appropriate for the desired transfer mechanism. The module then passes control to the called module to allow the called module to gain access to the information that is relevant to the transfer of the data object.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
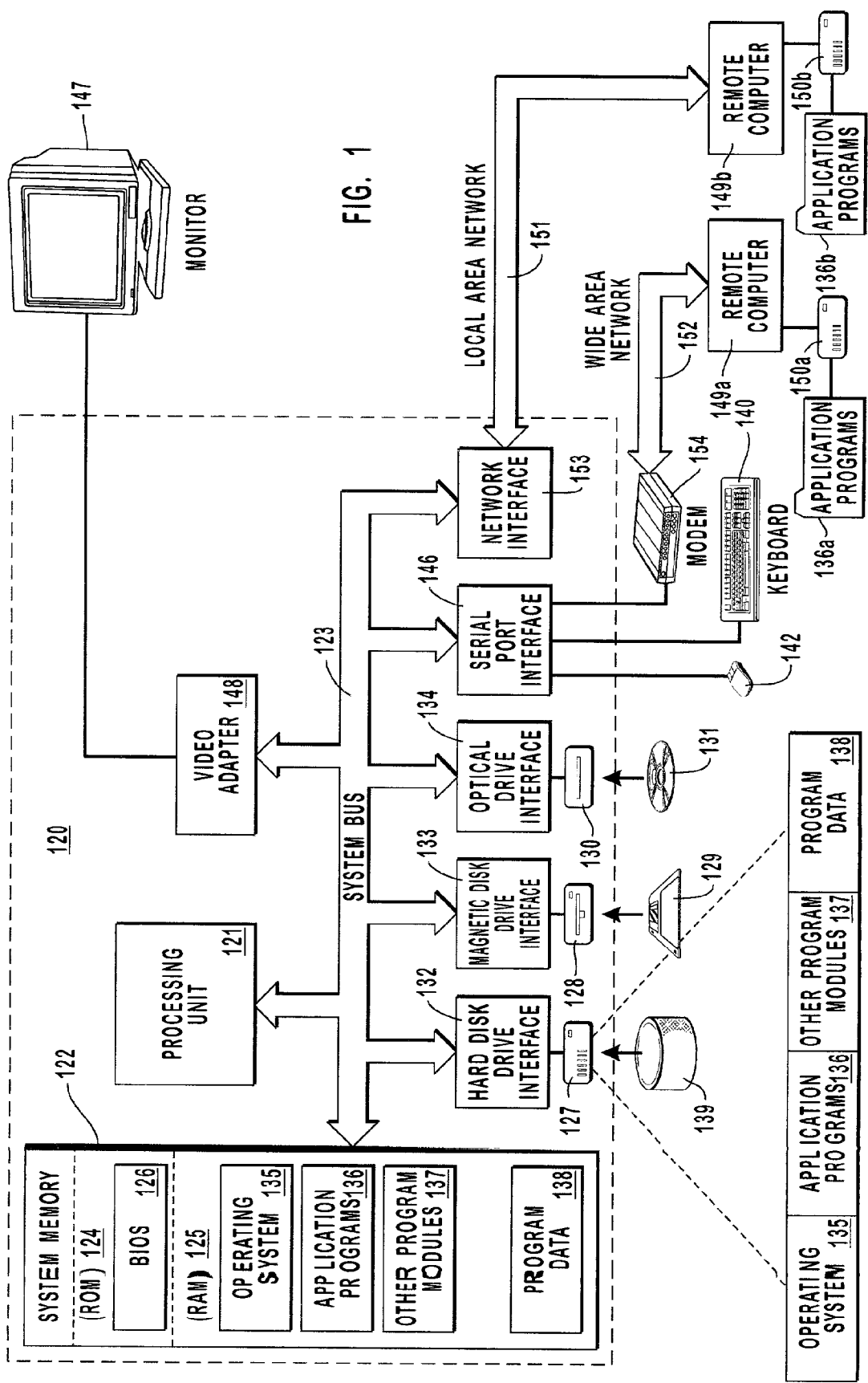
FIG. 1 illustrates a suitable operating environment in which the principles of the present invention may be employed.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-<based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
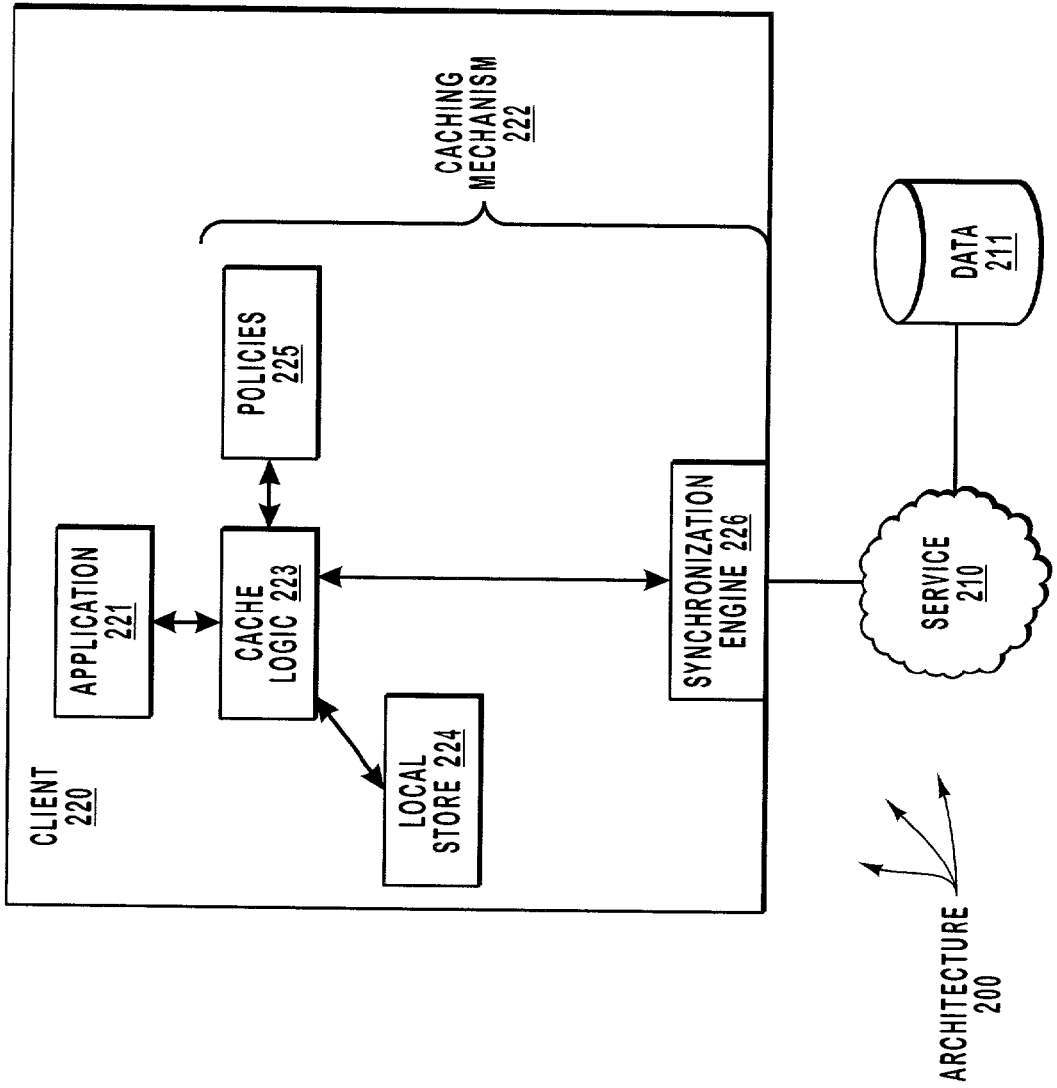
FIG. 2 illustrates a more specific architecture in which the principles of the present invention may be employed.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. Throughout this description, element numbers begin with the same number as the figure in which the corresponding elements were first introduced. For example, all of the element numbers in FIG. 1 are numbered in the 100's while the element numbers in FIG. 2 are number in the 200's, and so forth.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

FIG. 2 illustrates an architecture 200 that includes a service 210 and a client 220 that are coupled together via network 240. The client 220 may be, for example, the computer 120 described above with respect to FIG. 1, although the client 220 may be implemented by any computing device or system. The service 210 comprises a computing entity or a number of computing entities that cooperatively interact to maintain data 211. The client 220 includes an application 221 that potentially has interest in accessing the data 211. If the client 220 were computer 120, the application 221 may be, for example, the operating system 135, one of application programs 136, or perhaps one of the other program modules 137. In that case, the client 220 may have interest in incorporating at least part of the data 211 as its own program data 138.

One way for the client 220 to access data 211 is to request the data directly from the service 210 over the network 240. This is advantageous in that the returned data is fresh as of the requested time, but disadvantageous in that the properties of the network 240 may cause a response to the request to be noticeably slow with a relatively high latency. In order to avoid this potentially slow response, the client 220 has a sophisticated caching mechanism 222 as represented by the various modules to the left of the brackets 222.

When a request for particular data is dispatched by the application 221, the caching mechanism 222 determines whether the request may be satisfied by data already locally accessible by the client 220. If the local data is sufficiently fresh, then the request will be satisfied locally and not by sending the request over the network 240 to the service 210. This caching is advantageous in that a response to the request is much quicker than would be the response if the request had been sent over the network 240.

The caching mechanism includes a cache logic module 223. When the application 221 would like particular data from the service 210, the application 221 submits a request for the data to the cache logic module 223. The cache logic module 223 then determines, based on a policies module 225, whether the request would be best satisfied by immediately acquiring a cached copy of the requested data from a local store 224, or whether it was beneficial to obtain a copy of the requested data from the service 210 instead. If a copy from the service 210 is requested, the synchronization engine 226 may acquire the requested data from the service 210. Alternatively, the policies module 225 may dictate that the synchronization engine 226 should first synchronize all or a portion of the data 210 before the cache logic 223 acquires the data from the local store 224.

In one embodiment, the service 210 provides the data in an eXtensible markup language format. XML segments comprise a hierarchically structured tree in which each node in the tree is represented by a name-value pair called a tag. Each tag may have attributes that comprise further name value pairs that form the tag. XML segments are well known in the art and are widely used to represent data in a hierarchically-structured tree. The shape and characteristics of the XML tree may be defined by an XML Schema Description (XSD) language. One of the beneficial properties of XSD is that it allows for different XML structures to accommodate varying underlying properties of an item being described. In addition, XSD allows XML documents to be extended as the need for additional information regarding the item is recognized as being useful. The use of such schemas allows for applications to not only read the data, but to understand the data and thereby perform intelligent actions. For example, instead of just reading the data "1812", the application may understand that the data represents a year. Accordingly, the application may provide options to retrieve further historical data regarding the year 1812.

The application 221 and the various modules 223 through 226 of the caching mechanism 222 often have need to communicate the XML data, or a derivative form thereof, between each other. For example, the application 221 may identify the requested data to the cache logic module 223 (and receive a response thereto) using XML or an API that is derived from XML. Furthermore, the cache logic module 223 may instigate synchronization (or request the data from the service 210) by submitting an XML-based request to the synchronization engine 226.

Embodiments of the present invention involve ways to communicate data of a particular type between various modules. The principles of the present invention may be implemented in the embodiment illustrated in FIG. 2, or in any other environment in which one entity (e.g., a calling module) is to communicate data having a particular form (such as XML) to another entity (e.g., a called module).

Figure 3:
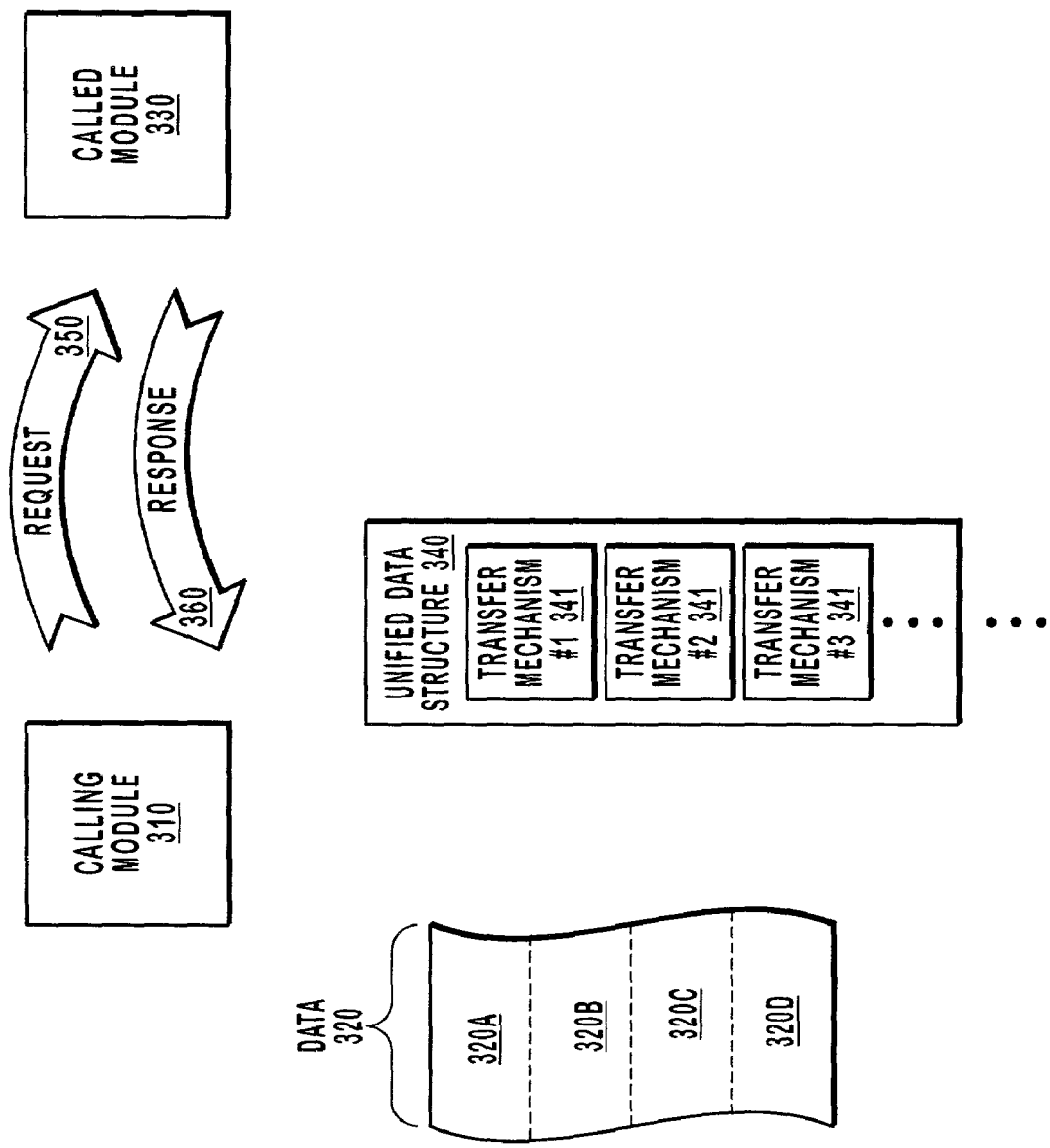
FIG. 3 schematically illustrates a calling module and a called module that may communicate data using a unified data structure.

FIG. 3 illustrates a general schematic in which a calling module 310 is to convey data 320 having a particular form to a called module 330. The conveyance is accomplished via a unified data structure 340 that includes various fields and has the ability to contain information relevant to the conveyance of the data 320 using a variety of different transfer mechanisms 341. In one example, there may be one field dedicated to each mechanism for transferring the data 320. For example, the unified data structure 340 includes a field for including information that facilitates the transfer of the data 320 using a transfer mechanism #1, a field for including information that facilitates the transfer of the data 320 using a transfer mechanism #2, a field for including information that facilitates the transfer of the data 320 using a transfer mechanism #3, and so forth.

Consider an example in which the particular type of the data 320 is XML. There are various transfer mechanisms that may be used when transferring an XML segment from one module to another. Some of the transfer mechanisms involve the simple conveyance of the XML document from one module to another while representing the XML document in a particular mode such as a UTF-8 or Unicode string, or perhaps as a DOM object. Such transfer mechanisms will be referred to herein as a "unidirectional" transfer mechanism. When using a unidirectional transfer mechanism, the information included in the appropriate field(s) of the unified data structure 340 may be, for example, the actual XML document itself represented in the desired mode (e.g., as string or DOM object).

Other transfer mechanisms involve cooperative interaction between the two communicating modules. Such transfer mechanisms will be referred to herein as "cooperative transfer mechanisms". For example, XML documents may be transferred using an ISAXContentHandler interface. Using this interface, the calling module establishes a source location into which it places the data to be transferred. The calling module then provides a handle to the called module that the called module may use to pull data from the source location.

Interestingly, the uniform data structure 340 in accordance with the present invention may not only be used to facilitated transfer using unidirectional transfer mechanisms, but may also be used for cooperative transfer mechanisms. For example, the uniform data structure 340 may be defined as being a potential input parameter as well as a potential output parameter. For example, when transferring the data 320 using the ISAXContentHandler interface, the calling module 310 may modify the unified data structure 340 to contain a handler for the source location in the appropriate field(s) of the uniform data structure 340. Another non-conventional interface referred to herein as an ITextSource interface may also use such a handler. The ITextSource interface may be similar to the industry-standard IStream interfaces and have the following structure:

interface ITextSource
{
    HRESULT PullText(
        [in] int nBufferLen,
        [out] int* pnEncoding,
        [out] int* pnDataLen,
        [out, size_is(nBufferLen), length_is(*pnDataLen)]
            byte* pText);
};

Other cooperative transfer mechanisms that may be used to transfer an XML document include an unconventional ITextSink interface as well as an IDOMSink interface, which may also be similar to the industry-standard IStream interfaces and have the following structure:

interface ITextSink
{
    HRESULT PushText(
        [in] int nEncoding,
        [in] int nByteLen,
        [in, size_is(nByteLen)] byte* pText);
};

interface IDOMSink
{
    HRESULT PushDOM(
        [in] IXmlDocument* pDom);
};

Using these interfaces, the calling module 310 may alter the appropriate fields of the uniform data structure 340 to include an identification of the appropriate interface method through which the data is to be transferred. For example, the uniform data structure 340 may indicate that the ITextSink interface is to be used, or that the IDOMSink interface is to be used. The called module 330 (rather than the calling module 310) would then establish the appropriate sink location into which the called module should push the data 320. The called module 330 then alters the uniform data structure 340 to identify the sink location, or to provide a sink handler, so that the calling module may push the data into the appropriate sink. Accordingly, the uniform data structure 340 may be used for both unidirectional as well as cooperative transfer mechanisms.

The following structure is C++ source code that defines the structure of a unified data structure called "XmlExchange" that is suitable for implementing the present invention. Line numbering is added for clarity.

1) struct XmlExchange union switch(XmlExchangeType)

2) case e_UTF8String: [string] char* m_szText 3) case e_UnicodeString: [string] WCHAR* m_wszText 4) case e_TextSource: ITextSource* m_pTextSource 5) case e_TextSink: ITextSink* m_pSink 6) case e_DOM: IXMLDOMDocument* m_pDOM 7) case e_DOMSink: IDOMSink* m_pDOMSink 8) case e_SAX: ISAXContentHandler* m_pSAXHandler 9) case e_RequestedType: XmlExchangeType m_eRequestedType As apparent from line 1 of this definition, the structure may be defined as a union. Lines 2 through 8 represent that the fields of the data structure that correspond to the corresponding transfer mechanisms UTF-8 string, Unicode string, ITextSource interface, ITextSink interface, DOM, IDOMSink interface, and ISAXContentHandler. Line 9 allows the caller to specify the type of transfer mechanism that is to be used. When the calling module specifies a transfer mechanism that requires the called module to establish a sink or other data structure (as in the ITextSink or IDOMSink interfaces), the called module responds by inserting information (e.g., a handle or pointer) that allows the calling module to access the sink or other data structure. Accordingly, the unified data structure 340 provides a unified mechanism to transfer the data 320 regardless of whether a unidirectional or cooperative transfer mechanism is used.

Although the data 320 may represent any information, in one embodiment, the data 320 represents a request such as the request 350 illustrated in FIG. 3. A response 360 to the request is also illustrated. The request 350 and the response 360 may be viewed as two separate (but correlated) transfers of data, the first from the calling module 310 to the called module 330, and the second from the called module 330 to the calling module 310. When making the initial request, the calling module 310 may not only specify the transfer mechanism to be used for the initial request, but may also specify the transfer mechanism to be used when responding. The response type may also be specified in the unified data structure 340 in a designated field.

For example, consider a case in which the calling module 310 is to transfer the data 320 to the called module 330 as a UTF-8 string, while the response is to be returned as a DOM object. This may be accomplished by either using the single unified data structure 340 for both the request and the response, or by establishing two separate unified data structures, one for the request, and one for the response. The following code illustrates a function call in which two XML Exchange data structures are defined, both XML Exchange data structures being designated as [in-out].

Execute (
 [in out] XML Exchange Request
 [in out] XML Exchange Response)

In the example, the XML Exchange Request data structure would be the unified data structure with the request type designated as "UTF-8 string" or the equivalent, while the XML Exchange Response data structure would be the unified data structure with the response type designated as "DOM" or the equivalent. Upon receiving this function call, the called module 330 would then read the UTF-8 string data from the appropriate field(s) in the XML Exchange Request data structure, gather the data for the response, and then return the XML Exchange Response data structure with the DOM object inserted into the appropriate field(s). The unified data structure may be used to transfer the data 320 using any of the transfer mechanisms, even in a request-response fashion.

Consider a more complex example in which the request is to be in the form of an ITextSink interface, while the response is to be returned using an ITextSource interface. This means that the data 320 will be supplied to a sink location designated by the called module 330, while the response will be supplied to a source location also designated by the called module 330. The XML Exchange Request data structure may thus indicate an "ITextSink" request type or the equivalent, while the XML Exchange Response data structure may thus indicate an "ITextSink" request type or the equivalent.

Upon receipt of these two XML Exchange data structures, the called module 330 would then establish a sink location into which the data 320 may be inserted by the calling module 310, as establish a source location into which the a response to the data may be inserted. The called module 330 then inserts sufficient information into the XML Exchange Request data structure (e.g., a handle or pointer to the sink) into the appropriate portion of the XML Exchange Request data structure (e.g., into the ITextSink field of the request data structure) that will allow the calling module 310 to write the data 320 to the sink location. The called module then passes control of the XML Exchange Request data structure back to the calling module 310. The calling module 310 then writes the data 320 to the sink, where it is read by the called module 330.

Upon formulating the response, the called module 330 inserts the response into the source location. Also, the called module 330 inserts sufficient information into the XML Exchange Response data structure (e.g., a handle or pointer to the source) into the appropriate portion of the XML Exchange Response data structure (e.g., into the ITextSource field of the response data structure) that will allow the calling module 310 to find and read from the source location. The calling module 310 may then read the response from the source location. Accordingly, use of the uniform data structure 340 allows for flexibility not only in how the data 320 is conveyed from the calling module 310 to the called module 330, but also in how the response 360 is conveyed back from the called module 330 back to the calling module 310.

The principles of the present invention also provide flexibility in how components of the data 320 are transferred from a calling module 310 to a called module 330. For example, referring to FIG. 3, data 320 is compartmentalized into four different components 320A, 320B, 320C, and 320D. Each of these components may be transferred using different transfer mechanisms. For example, consider a case in which the data 320 is an XML document, each of the components 320A through 320D may be a different segment of the XML document. For example, component 320A may be the header portion of the XML document, component 320D may be the footer portion of the XML document, component 320B may be the first half of the body portion of the XML document, and component 320C may be the second half of the body portion of the XML document.

Different transfer mechanisms may be more beneficial for different portions of the XML document. For example, suppose the portions 320A and 320D are available only as UTF-8 strings, while portions 320B and 320C are available DOM objects and as UTF-8 strings. DOM objects require processing resources to create. Accordingly, one might not choose to develop DOM objects for portions 320A and 320D. However, DOM objects are beneficial as they contain parsing information thereby making them easier to parse. DOM objects already exist for portions 320B and 320C so using DOM objects for portions 320B and 320C may be preferred over using the UTF-8 strings. Accordingly, one may use the principles of the present invention to obtain the benefit of transferring the portions 320A and 320D using UTF-8 strings, while transferring portions 320B and 320C using DOM objects.

In order to accomplish this, several XML Exchange data structures may be used, one for each portion for the transfer of the data 320 (four data structures total) and one for however many portions there are in the response, if any. Other than the establishment of multiple unified data structure, the transfer of each component of the data 320 may be accomplished as described above as for a single data item. According, the unified data structure 340 in accordance with the present invention allows for the unified delivery of data having a particular format from one module to the other, and for the unified return of a response.

Figure 4:
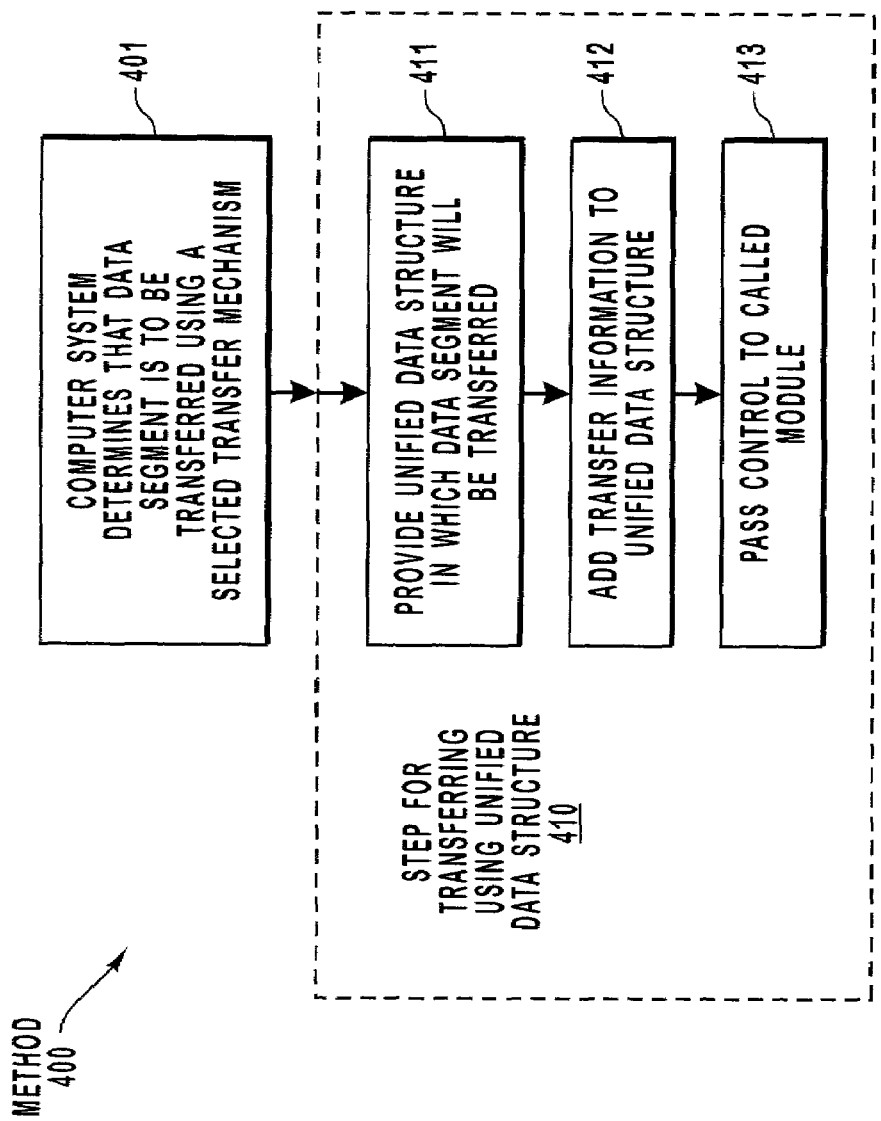
FIG. 4 illustrates a flowchart of a method for transferring a data segment of a particular type in accordance with the present invention.

FIG. 4 illustrates a method 400 for transferring a data segment having a particular format in accordance with the present invention. The method includes an act of a computer system (e.g., the client 220) determining that a data segment of the particular type is to be transferred from the calling module 310 to the called module 330 using a selected one of the number of transfer mechanisms (act 401). The data segment may be an object, a file, a document, or any other data item or portion thereof.

The method 400 then includes a functional, result-oriented step for transferring the data segment from the calling module 310 to the called module 330 using a unified data structure regardless of which if the plurality of transfer mechanism is the selected transfer mechanism (step 410). The step includes any corresponding acts for accomplishing this result. However, in the illustrated method 400 of FIG. 4, this step 410 includes corresponding acts 411, 412 and 413.

In particular, the computer system provides a unified data structure in which the data segment will be transferred (act 411). This unified data structure contains a number of data fields into which information may be added. Each of the fields may contain information for transferring the data segment using a particular transfer mechanism. The calling module then adds information to the unified data structure to a particular one or more of the plurality of data fields (act 412). The identity of the one or more data fields into which the information is inserted depends on the selected transfer mechanism. The calling module 310 then passes control of the unified data structure from the calling module 310 to the called module 330 (act 413).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that is capable of transferring data segments of a particular type from a calling module to a called module using a plurality of transfer mechanisms, a method of conveying the data segment in a uniform manner for at least some of the plurality of transfer mechanisms, the method comprising the following:

an act of the computer system determining that a data segment of a particular type is to be transferred from the calling module to the called module;

an act of the computer system determining which of a plurality of transfer mechanisms is selected as a transfer mechanism for transferring the data segment from the called module to the calling module;

an act of the computer system providing a unified data structure in which the data segment will be transferred, the unified data structure containing various data fields into which the data segment may be added, wherein the unified data structure includes:

a first set of a plurality of data fields, each of the first set of the plurality of data fields being dedicated to hold only a data segment of a particular data type, such that each data field of the first set will always hold data only according to its respective data type, and such that each data field of the first set of the plurality of data fields is dedicated to a different particular data type; and a second set of a plurality of data fields, each of the second set of the plurality of data fields being dedicated to hold information that facilitates transfer of data segments according to a respective data transfer interface, such that each field of the second set will always hold data only according to its respective data transfer interface, and such that each data field of the first set of the plurality of data fields is dedicated to a different data transfer interface, wherein at least one of the data fields of the second set of the plurality of data fields is dedicated to an ISAXContentHandler interface, an ITextSource interface, an ITextSink interface, or an IDOMSink interface;

an act of the calling module adding information to the unified data structure to a particular one or more of the plurality of data fields, wherein the one or more data fields into which the information is inserted are selected depending on the selected transfer mechanism that includes at least one of a particular data type or a particular transfer interface; and an act of the calling module passing control of the unified data structure from the calling module to the called module.

2. A method in accordance with claim 1, wherein the act of the calling module adding information to the unified data structure comprises the following:

an act of the calling module placing a form of the data segment into the unified data structure.

3. A method in accordance with claim 1, wherein the act of the calling module adding information to the unified data structure comprises the following:

an act of the calling module adding information that identifies a source location, wherein the method further comprises the following after the act of the calling module passing control of the unified data structure from the calling module to the called module;

an act of the calling module inserting the data segment into the source location; and an act of the called module reading the data segment from the source location.

4. A method in accordance with claim 3, wherein the act of the called module reading the data segment from the source location comprises the following:

an act of the called module reading portions of the data segment from the source location before the calling module has inserted the entire data segment into the source location.

5. A method in accordance with claim 3, wherein the act of the called module reading the data segment from the source location comprises the following:

an act of the called module reading portions of the data segment from the source location after completion of the act of the calling module inserting the data segment into the source location.

6. A method in accordance with claim 1, wherein the act of the calling module adding information to the unified data structure comprises the following:
   an act of the calling module adding information that identifies that the calling module is to insert the data segment into a sink location that is to be identified by the called module;
   wherein the method further comprises the following after the act of the calling module passing control of the unified data structure from the calling module to the called module;
   an act of the called module inserting an identification of the sink location in the unified data structure;
   an act of the called module passing control of the unified data structure back to the calling module;
   an act of the calling module inserting the data segment into the sink location; and
   an act of the calling module reading the data segment from the sink location.

7. A method in accordance with claim 1, wherein the data segment is a portion of a request, the method further comprising the following before the act of the calling module passing control of the unified data structure from the calling module to the called module:
   an act of the calling module identifying a response transfer mechanism to use when the called module responds to the request.

8. A method in accordance with claim 7, wherein the act of the calling module identifying a response transfer mechanism comprises the following:
   an act of the calling module identifying a response transfer mechanism in which the called module is to insert at least a portion of the response into the unified data structure.

9. A method in accordance with claim 7, wherein the unified data structure is a first unified data structure, and wherein the act of the calling module identifying a response transfer mechanism comprises the following:
   an act of the calling module identifying a response transfer mechanism in which the called module is to insert at least a portion of the response into a second unified data structure.

10. A method in accordance with claim 7, wherein the act of the calling module identifying a response transfer mechanism comprises the following:
    an act of the calling module identifying a response transfer mechanism in which the called module is to insert at least a portion of the response into a sink location identified by the calling module, the method further comprising the following after the act of the calling module passing control of the unified data structure to the called module:
    an act of the called module inserting the at least a portion of the response in the identified sink location; and
    an act of the calling module reading the at least a portion of the response from the identified sink location.

11. A method in accordance with claim 7, wherein the act of the calling module identifying a response transfer mechanism comprises the following:
    an act of the calling module identifying a response transfer mechanism in which the called module is to insert at least a portion of the response into a source location to be identified by the called module, the method further comprising the following after the act of the calling module passing control of the unified data structure to the called module:
    an act of the called module inserting an identification of the source location in the unified data structure;
    an act of the called module passing control of the unified data structure back to the calling module;
    an act of the called module inserting the at least a portion of the response into the source location; and
    an act of the calling module reading the at least a portion of the response from the source location.

12. A method in accordance with claim 1, wherein the data segment comprises an eXtensible Markup Language (XML) segment.

13. A method in accordance with claim 12, wherein the at least some of the plurality of transfer mechanisms comprise transferring the data segment as a UTF-8 string.

14. A method in accordance with claim 12, wherein the at least some of the plurality of transfer mechanisms comprise transferring the data segment as a Unicode string.

15. A method in accordance with claim 12, wherein the at least some of the plurality of transfer mechanisms comprise transferring the data segment as a DOM object.

16. A method in accordance with claim 1, wherein the data segment is a first data segment, wherein the selected transfer mechanism is a first selected transfer mechanism and wherein the unified data structure is a first unified data structure, the method further comprising the following:
    an act of splitting a data item into a plurality of data segments including the first data segment and a second data segment;
    an act of the computer system determining that the second data segment is to be transferred from the calling module to the called module using a second selected transfer mechanism of the plurality of transfer mechanisms;
    an act of the computer system providing a second unified data structure in which the second data segment will be transferred, the second unified data structure containing a plurality of data fields;
    an act of the calling module adding information to the second unified data structure to a particular one or more of the plurality of data fields, wherein the identity of the one or more data fields into which the information is inserted depends on the second selected transfer mechanism; and
    an act of the calling module passing control of the second unified data structure from the calling module to the called module,
    wherein the first data segment and the second data segment may be transferred using different transfer mechanisms despite being split from the same data item.

17. A computer program product for use in a computer system that is capable of transferring data segments of a particular type from a calling module to a called module using a plurality of transfer mechanisms, the computer program product for implementing a method of conveying the data segment in a uniform manner for at least some of the plurality of transfer mechanisms, the computer program product comprising one or more physical computer readable storage media having stored thereon the following:
    computer-executable instructions for determining that a data segment of a particular type is to be transferred from the called module to the calling module;
    computer-executable instructions for determining which of a plurality of transfer mechanisms is selected as a transfer mechanism for transferring the data segment from the called module to the calling module;

computer-executable instructions for providing a unified data structure in which the data segment will be transferred, the unified data structure containing various data fields into which the data segment may be added, wherein the unified data structure includes:
- a first set of a plurality of data fields, each of the first set of the plurality of data fields being dedicated to hold only a data segment of a particular data type, such that each data field of the first set will always hold data only according to its respective data type, and such that each data field of the first set of the plurality of data fields is dedicated to a different particular data type; and
- a second set of a plurality of data fields, each of the second set of the plurality of data fields being dedicated to hold information that facilitates transfer of data segments according to a respective data transfer interface, such that each field of the second set will always hold data only according to its respective data transfer interface, and such that each data field of the first set of the plurality of data fields is dedicated to a different data transfer interface, wherein at least one of the data fields of the second set of the plurality of data fields is dedicated to an ISAXContentHandler interface, an ITextSource interface, an ITextSink interface, or an IDOMSink interface;

computer-executable instructions for adding information to the unified data structure to a particular one or more of the plurality of data fields, wherein the one or more data fields into which the information is inserted are selected depending on the selected transfer mechanism that includes at least one of a particular data type or a particular transfer interface; and computer-executable instructions for the calling module passing control of the unified data structure from the calling module to the called module.

18. A computer system comprising the following:
one or more processors;
a storage medium that stores computer-executable instructions;
system memory, wherein the computer-executable instructions cause the following to be created in the system memory when executed by the one or more processors:
- a unified data structure that contains a plurality of data fields into which information may be added, wherein the plurality of data fields include:
  - a first set of a plurality of data fields, each data field of the first set being dedicated to hold only information of a particular data type, such that each data field of the first set will always hold data only according to its respective data type, and each data field of the first set being dedicated to hold a data type different from each other data field of the first set;
  - a second set of a plurality of data fields, each of the second set of the plurality of data fields being dedicated to hold information that facilitates transfer of data segments according to a respective data transfer interface, such that each field of the second set will always hold data according to only its respective transfer interface, wherein at least one of the data fields of the second set of the plurality of data fields is dedicated to an ISAXContentHandler interface, an ITextSource interface, an ITextSink interface, or an IDOMSink interface;
- a data segment to be transferred from a calling module to a called module;
- a calling module configured to add information to the unified data structure to a particular one or more of the plurality of data fields, wherein the one or more data fields into which the information is inserted is selected depending on a selected transfer mechanism for transferring the data segment; and
- a called module configured to selectively access the unified data structure.

19. In a computer system that is capable of transferring data segments of a particular type from a calling module to a called module using a plurality of transfer mechanisms, a method of conveying the data segment in a uniform manner for at least some of the plurality of transfer mechanisms, the method comprising the following:
an act of the computer system determining that a calling module is requesting a data segment from a called module, wherein the request includes a first unified data structure, the first unified data structure including:
- a first set of a plurality of data fields, each data field of the first set of the plurality of data fields being dedicated to hold only a data segment of a particular data type, such that each field of the first set will always hold data only according to its respective data type, and each data field of the first set being dedicated to hold data of a type differing from each other data field of the first set, the first set of data fields including at least three data fields each dedicated to one of UTF-8 string, Unicode string, and DOM object;
- a second set of a plurality of data fields, each of the second set of the plurality of data fields being dedicated to hold information facilitating transfer according to a respective data transfer interface, such that each data field of the second set will always hold data only according to its respective transfer interface, and each data field of the second set being dedicated to hold information according to a data transfer interface differing from each other data field of the second set, the second set of data fields including at least four data fields each dedicated to one of ITextSource interface, ITextSink interface, IDOMSink interface, and ISAXContentHandler; and
- at least one transfer mechanism data field dedicated so as to include information added by the calling module to identify a specific type of transfer mechanism for use by the calling module in providing the data segment to the called module;

an act of the computer system reviewing the request from the called module, including the first unified data structure, and determining that a data segment of a particular type is to be transferred to the calling module;

an act of the computer system reviewing the first unified data structure and determining that a cooperative data transfer mechanism is specified in the at least one transfer mechanism data field, the computer system further determining that the calling module should use the transfer mechanism specified by the caller in the at least one transfer mechanism data field to provide the data segment to the called module;

an act of the calling module adding information to the first unified data structure to a particular one of the data fields of the second set of data fields, wherein the selected particular one of the data fields into which the information is added is selected as being dedicated to hold information corresponding to the specified cooperative data transfer mechanism specified in the at least one transfer mechanism data field;

an act of providing the a second unified data structure, the second unified data structure being organized so as to be substantially identical to the first unified data structure;

an act of the called module inserting an identification of a source location in the second unified data structure;

an act of the called module passing control of the second unified data structure to the calling module to identify to the calling module where the calling module can find the data of the first unified data structure;

an act of the called module inserting at least a portion of the first unified data structure into the source location as a response to the request of the calling module; and an act of the calling module identifying the source location from the second unified data structure, and reading the at least a portion of the first unified data structure from the source location.

* * * * *